United States Patent [19]

Trautvetter et al.

[11] 4,036,775

[45] July 19, 1977

[54] PROCESS FOR THE PRODUCTION OF A MARBLED OR MOTTLED SOAP CAKE AND THE PRODUCT OF SUCH PROCESS

[75] Inventors: Jutta Trautvetter, Monchen-Gladbach, Albert Weingartz, Moers; Lothar Werner, Krefeld, all of Germany

[73] Assignee: Henkel & Cie G.m.b.H., Dusseldorf-Holthausen, Germany

[21] Appl. No.: 589,795

[22] Filed: June 23, 1975

[30] Foreign Application Priority Data

June 28, 1974 Germany ............................ 2431048

[51] Int. Cl.[2] ............................................... B29C 9/00

[52] U.S. Cl. ........................................ 252/134; 83/44; 83/55; 264/75; 264/148; 264/211; 264/245; 264/320; 264/325; 252/174; 252/370; 252/DIG. 16

[58] Field of Search ................. 264/75, 211, 148, 157, 264/160, 325, 245, 320, 297, 161; 83/39–40, 44, 50, 55; 252/367-371; 241/301.3

[56] References Cited

U.S. PATENT DOCUMENTS

| | | | |
|---|---|---|---|
| 461,973 | 10/1891 | Brown | 264/325 |
| 1,322,081 | 11/1919 | Ayres | 264/157 |
| 2,414,097 | 1/1947 | Garvey et al. | 264/176 R |
| 3,159,699 | 12/1964 | Sutphin | 264/320 |
| 3,485,905 | 12/1969 | Compa et al. | 264/75 |
| 3,832,431 | 8/1974 | Matthaei | 264/211 |
| 3,899,566 | 8/1975 | Murray | 264/245 |

FOREIGN PATENT DOCUMENTS

| | | | |
|---|---|---|---|
| 1,953,916 | 5/1971 | Germany | 264/148 |

*Primary Examiner*—Jeffery R. Thurlow
*Attorney, Agent, or Firm*—Hammond & Littell

[57] ABSTRACT

A process for the production of a marbled or mottled cake or bar, particularly of soap, comprising cutting an extruded rope having axially aligned section of different colors, into blanks of the desired dimension, at an angle $\alpha$ of 75° to 15° to the axis of said extruded rope, stamp molding said blanks with the direction of stamping at an angle $\beta$ of from 90° to 30° to the cut surfaces of said blank, and recovering a marbled or mottled cake or bar of soap.

4 Claims, 7 Drawing Figures

PROCESS FOR THE PRODUCTION OF A MARBLED OR MOTTLED SOAP CAKE AND THE PRODUCT OF SUCH PROCESS

RELATED ART

Processes for the production of marbled or mottled cakes or bars, particularly of soap, by extrusion through a screw extruder, in which the rope or extruded section consisting of a mottled mass is cut up into blanks, which are then subjected to a stamping process, are known.

A process of this type is described in German Pat. No. 1,953,916. The aim of invention claimed in this patent is to attain an aesthetic effect on the pieces of soap formed. This is made possible by turning the shapes or blanks round by 90° after they have been cut off and then stamping them in the axial direction. Mottled structures are formed with colored filaments comparable to wood grain branching off radially or regularly from the axis of symmetry and running towards the periphery of the structure.

In the commercial development of this invention it has now been found that the pieces of soap thus made tend to develop fissures which extend more or less through the bars or tablets during use thereof and upon drying.

OBJECTS OF THE INVENTION

An object of this invention is therfore to improve the known process for the production of mottled soap according to German Pat. No. 1,953,916 so that either fissures no longer form on drying after use, or at least the fissure formation is no longer troublesome for all practical purposes, however with the mottling with the mottled filaments running radially from a center point to the periphery of the piece of soap nevertheless remaining.

Another object of the present invention is the development of a process for the production of a marbled or mottled cake or bar comprising the steps of cutting an extruded strand of the required dimension, having axially aligned filaments or layers of a different color from the principal color, into stamping blanks of the desired dimensions, at an angle $\alpha$ of from 75° to 15° to the axis of said extruded strand, stamp molding said stamping blanks at an angle $\beta$ of from 90° to 30° to the cut surfaces of said stamping blank, and recovering a marbled or mottled cake or bar.

A further object of the present invention is the obtaining of a marbled or mottled cake or bar produced by the above process having mottled filaments running radially from a center point to the periphery of said cake or bar.

These and other objects of the invention will become more apparent as the description thereof proceeds.

THE DRAWINGS

DESCRIPTION OF THE INVENTION

Figure 1:
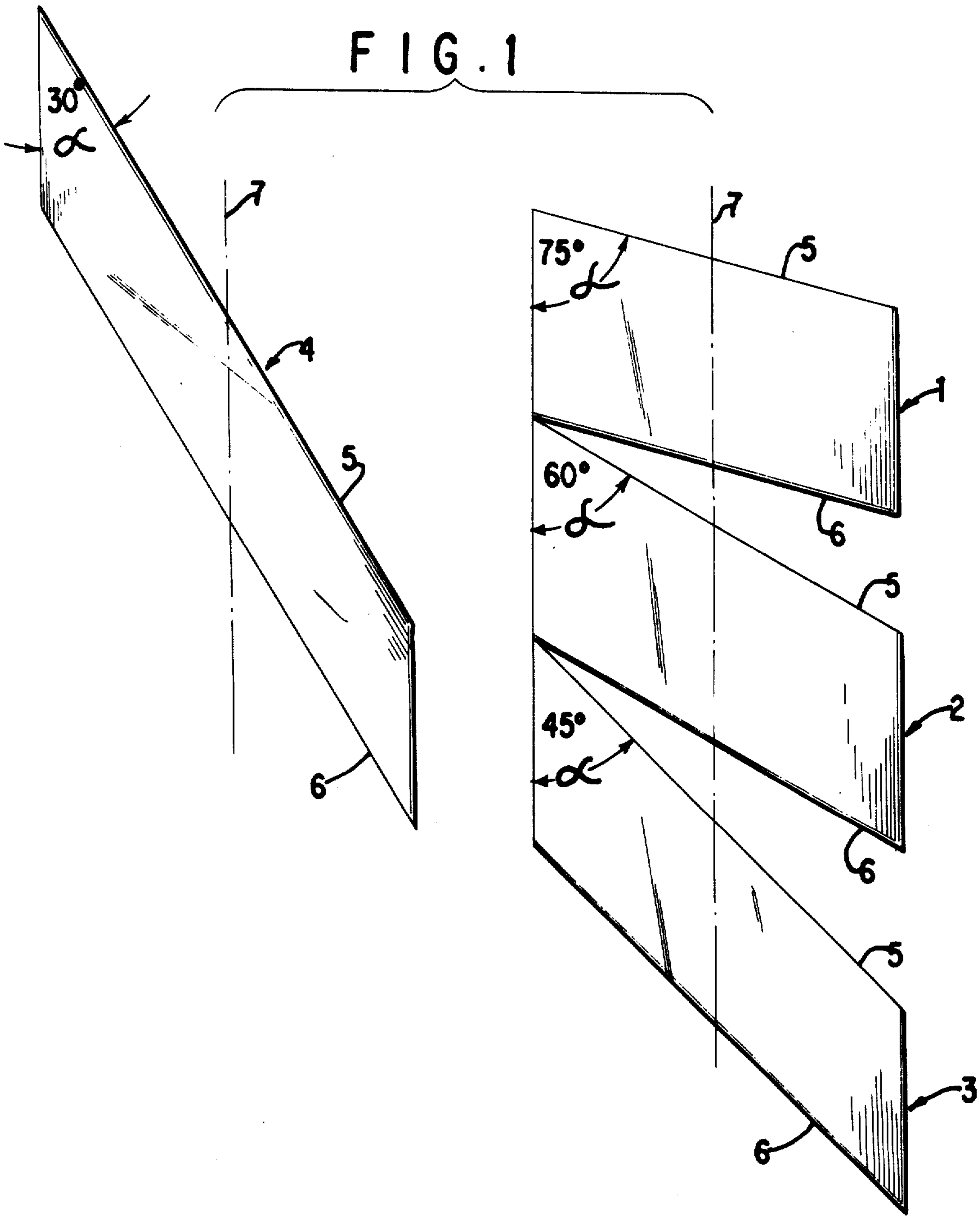
FIG. 1 depicts various stamping blanks with different angle $\alpha$.

The above objects have been achieved by the development of a method for producing a marbled or mottled mass, in particular of soap, using screw extruders in which either dyestuff is introduced through openings in the screw extruder cylinder into the mass being extruded or different colored soap masses are extruded in separate screw extruders and then mixed, in which method the extruded mass, which is marbled or mottled in axially aligned sections, is cut into stamping blanks, the cut surfaces being at an angle $\alpha$ of from 75° to 15°, preferably from 60° to 45°, to the axis of the extruded mass, and the stamping blanks are stamp molded, the direction of stamping being at an angle $\beta$ of from 90° to 30°, preferably 90° to 45°, to the cut surfaces of the blank.

By soaps are meant solid pieces of cleaning agents, which contain the usual fatty acid salts or synthetic detergent substances or mixtures of both.

By axis of the extruded section is meant the axis of symmetry of the rope or mass of soap issuing from the screw extruder.

More particularly therefore, the present invention relates to a process for the production of a marbled or mottled cake or bar comprising the steps of cutting an extruded strand of the required dimensions, having axially aligned filaments or layers of a different color from the principal color, into stamping blanks of the desired dimensions, at an angle $\alpha$ of from 75° to 15° to the axis of said extruded strand, stamp molding said stamping blanks at an angle $\beta$ of from 90° to 30° to the cut surfaces of said stamping blank, and recovering a marbled or mottled cake or bar; as well as the marbled or mottled cake or bar so produced and having mottled filaments running radially from a center point to the periphery of said cake or bar.

Owing to the fact that the cut surfaces are made in each case at an angle $\alpha$ of 75° to 15°, preferably from 60° to 45° to the axis of the extruded section, soap stamping blanks are obtained in which the bounding surfaces formed by the cut surfaces run parallel, but are no longer perpendicular to the axis of the extruded section. If now the stamping blanks thus produced are stamped, in which case the direction of stamping proceeds at an angle $\beta$ of 90° to 30°, preferably from 90° to 45° to the cut surfaces, the individual mottling filaments are less strongly distorted than when the blanks standing on edge are molded into pieces of soap in a known way. It was recognized that the tendency to fissure formation on drying was obviously connected with too great a distortion of the mottling filaments. Anyhow it was determined that, with a cutting angle $\alpha$ of less than 75° to the axis of the extruded section and on adjustment of the angle $\beta$ of the stamping direction to the cut surface of less than 90°, the tendency toward fissure formation on wetting and drying already largely ceased and could be disregarded for practical purposes.

A reduction of the cutting angle $\alpha$ to below 15° is not advisable, since the aesthetic feature thereby desired, namely the formation of the above-described marbled or mottled structures with filaments running substantially from a central point radially to the periphery, can no longer be obtained. Depending on the size of the cutting angle $\alpha$, it is possible not only to obtain the known mottled structures, but apart from this numerous variations are possible so that the pieces of soap have partly structures with radial filaments, which do not start from a center point lying in the axis of symmetry of the finished piece of soap and then adjacent filaments are oriented in a preferred longitudinal direction on a further part of the piece.

Figure 2:
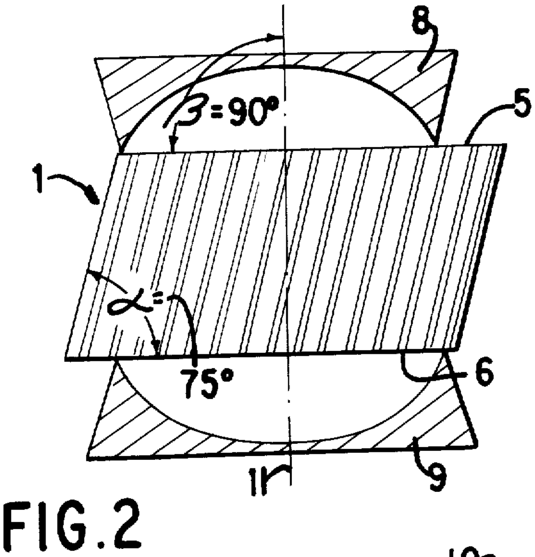
FIG. 2 depicts a stamping blank in a mold before stamping.
Figure 5:
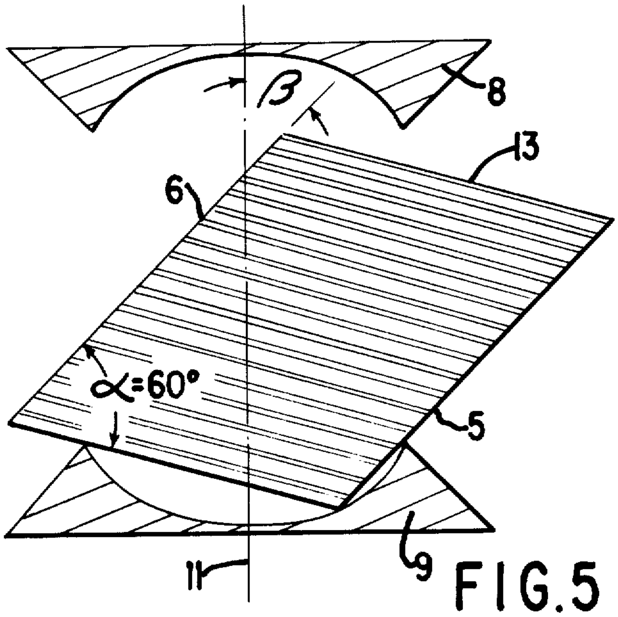
FIG. 5 depicts another stamping blank in a mold before stamping.
Figure 3:
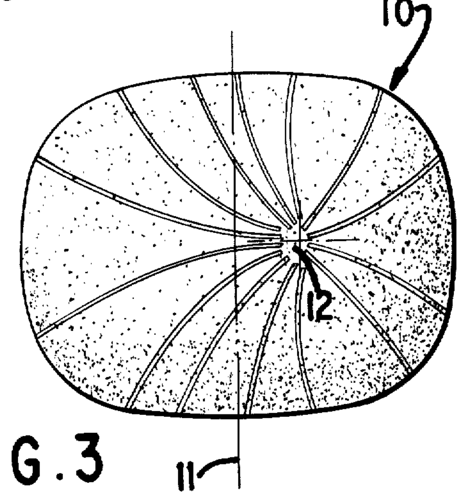
FIG. 3 depicts one side of the molded blank of FIG. 2.
Figure 6:
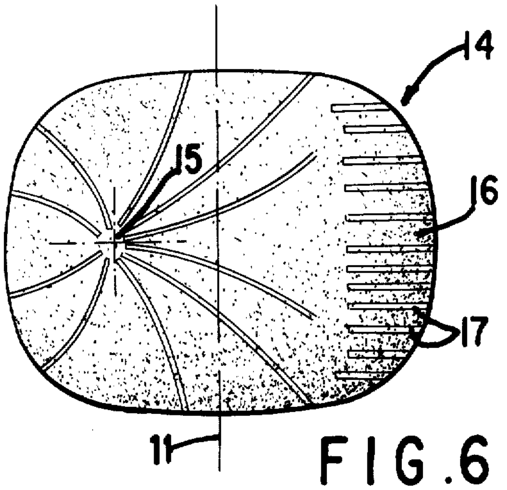
FIG. 6 depicts one side of the molded blank of FIG. 5.
Figure 4:
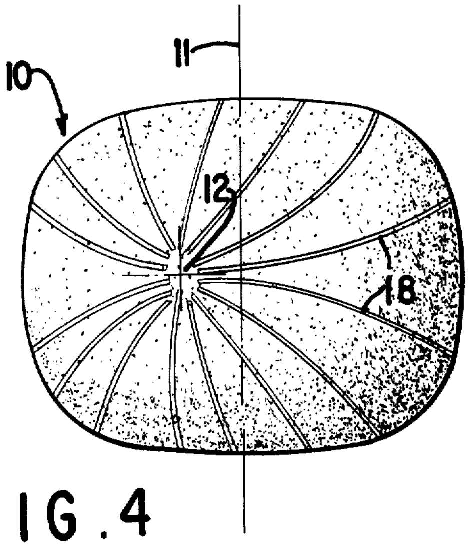
FIG. 4 depicts the reverse side of the molded blank of FIG. 2.

The present invention will now be further described with reference to the accompanying drawings, in which:

FIG. 1 shows various stamping blanks;

FIG. 2 shows a stamping blank in a mold before stamping;

FIG. 3 shows one side of the molded blank of FIG. 2 after stamping;

FIG. 4 shows the reverse side of the molded blank of FIG. 2;

FIG. 5 shows a further stamping blank in a mold before stamping;

FIG. 6 shows one side of the molded blank of FIG. 5 after stamping; and

Figure 7:
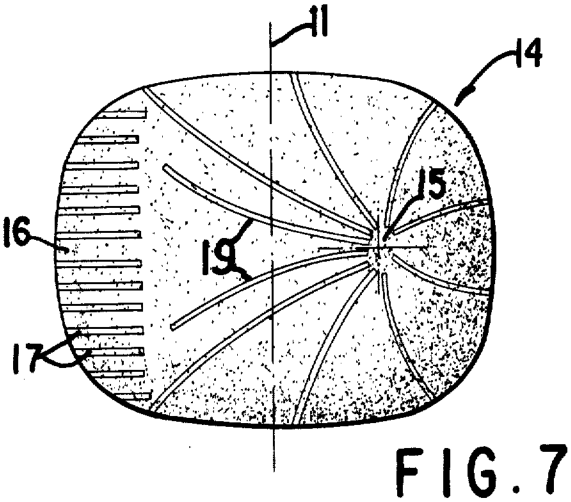
FIG. 7 depicts the reverse side of the molded blank of FIG. 5.

FIG. 7 shows the reverse side of the molded blank of FIG. 5.

Stamping blanks 1,2,3 and 4 (FIG. 1) each have two cut surfaces 5,6 which are at an angle $\alpha$ to the axis 7 of an extruded section of a mottled or marbled soap. $\alpha$ for stamping blank (1) is 75°, for stamping blank 2, 60°, for stamping blank 3, 45° and for stamping blank 4, 30°.

Stamping blank 1 is placed between the two halves 8,9 of a stamping mold, the direction of stamping being at an angle $\beta$ of 90° to the cut surfaces 5,6 to give, on stamping, a piece of soap 10 in bar or cake form (FIGS. 3 and 4) having a typical mottled structure, in which some of the marbled filaments 18 radiate from a point 12 not lying in the axis of symmetry 11 of the piece of soap 10.

Another soap stamping blank 13 (FIG. 5) having been cut at an angle $\beta$ of 60° is shown in a stamping mold 8,9 in which the stamping direction is at an angle $\beta$ of 45° to the parallel cut surfaces 5,6 of the soap stamping blank 13. A piece of soap 14 in bar or cake form is produced on stamping the stamping blank 13 (FIGS. 6 and 7) in which marbled filaments 19 extend radially from a point 15, not lying on the central axis 11, to the periphery of the piece of soap 14 or to an area 16 at one end of the piece of soap 14 in which parallel filaments 17 extend from the periphery of the piece of soap 14 part of the way to the central axis 11.

Obviously other fiber patterns are obtainable having an eccentric point of origin with other angles $\beta$ of stamping.

The preceeding specific embodiments are illustrative of the practice of the invention. It is to be understood however that other expedients known to those skilled in the art or disclosed herein may be employed without departing from the spirit of the invention or the scope of the appended claims.

We claim:

1. A process for the production of a marbled or mottled soap cake or soap bar comprising the steps of extruding and forming a soap strand of the required dimensions, having axially aligned filaments or layers of a different color from the principal color therein, cutting said extruded strand of the required dimensions, having axially aligned filaments or layers of a different color from the principal color into stamping blanks of the desired dimensions, substantially parallel at an angle $\alpha$ of from 75° to 15° to the axis of said extruded strand, stamp molding said stamping blanks at an angle $\beta$ of from 90° to 30° to the cut surfaces of said stamping blank, and recovering a marbled or mottled soap cake or soap bar.

2. The process of claim 1 wherein said angle $\beta$ is from 60° to 45° to the axis of said extruded strand.

3. The process of claim 1 wherein said angle $\beta$ is from 90° to 45° to the said cut surfaces of said stamping blank.

4. The marbled or mottled soap cake or soap bar produced by the process of claim 1 and having mottled filaments running radially from a center point not on the axis of symmetry to the periphery of said soap cake or soap bar.

* * * * *